July 5, 1949.　　　　P. ROSEN　　　　2,475,462
MOUSETRAP
Filed Jan. 24, 1947
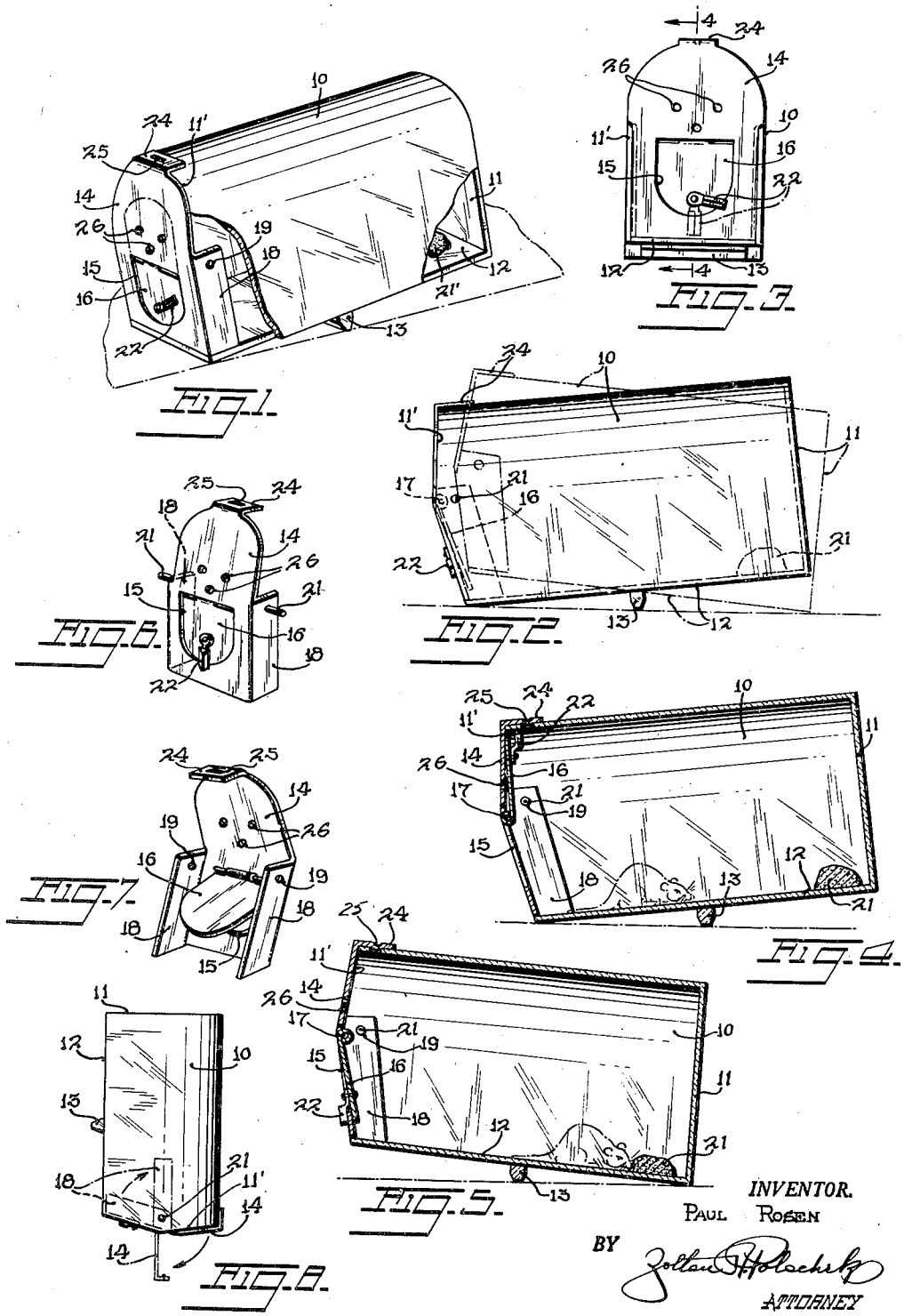
INVENTOR.
PAUL ROSEN
BY
Zoltan Holschek
ATTORNEY Patented July 5, 1949

2,475,462

UNITED STATES PATENT OFFICE 2,475,462

MOUSETRAP

Paul Rosen, West Orange, N. J.

Application January 24, 1947, Serial No. 724,159

5 Claims. (Cl. 43—61)

This invention relates to sanitary mouse traps.

It is an object of the present invention to provide a mouse trap wherein the process of catching and disposing of the mouse does not require handling of the mouse or any contact with the mouse, dead or alive, and wherein the mouse will not be mangled upon being caught and consequently spread blood upon the floor or the mangled carcass of the mouse will not remain lying on the floor for a considerable period of time upon which flies may feed and which may serve as a carrier of the disease infected mice germs to a child or adult or to their food by the spread of germs thereto.

It is another object of the present invention to provide a mouse trap of such construction that the mouse will, when caught, be contained within a container which can be picked up without placing the hand upon any part which has been contacted by the mouse and wherein the container can be used in the final disposal of the mouse and into which water is poured to effect the drowning of the mouse and wherein a pivoted gate is provided through which the mouse can be discharged along with the water upon removing the mouse and water from the container, and whereby the container or trap is kept always clean and sanitary and ready to be used over again.

It is another object of the present invention to provide a sanitary mouse trap which does not require the setting of a spring or latch to effect the placing of the trap in readiness to receive the mouse and which does not need to be operated to effect the release of the mouse once it has been caught, this last being a very unpleasant and unsanitary operation, and wherein no part of the trap that had contact with the mouse must be handled.

According to the invention, there is provided a container which is permanently closed at one end and wherein there is provided at the opposite end a closure member adapted to be tilted intermediate its height to permit the removal of the mouse and in which closure member there is a trap door extended over an opening and through which the mouse enters the container. The container is preferably made of glass or plastic so as to permit the interior thereof to be observed. The bottom of the base has a transverse pivoted support connected to it. When the trap is set the container will be tilted forwardly. After the mouse enters, the container will be tilted rearwardly under his weight. At the same time the trap door will be automatically closed behind him. The closure member is so shaped that when the trap is tilted forwardly, the trap door will in its raised position lie just forwardly of a vertical plane and rest upon the inner face of the closure member. As the container is tilted backwardly the trap door will pass through the vertical plane to the rear thereof and then under its weight will be dropped to a closed position over the opening in the closure member.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of the mouse trap embodying the features of the present invention and with the trap being tilted to the set position.

Fig. 2 is a side elevational view of the trap shown in Fig. 1.

Fig. 3 is an end elevational view of the end closure and of the trap door contained therein.

Fig. 4 is a longitudinal cross sectional view taken on line 4—4 of Fig. 3, looking in the direction of the arrows thereof.

Fig. 5 is a longitudinal cross sectional view similar to Fig. 4 showing the container in its rearwardly tilted position and with the trap door down.

Fig. 6 is a perspective view of the closure removed from the end of the container.

Fig. 7 is a perspective view of the closure removed from the container, looking upon the rear of the same.

Fig. 8 is an inverted view of the container after the closure has been pivoted to permit the discharge of the mouse through the end opening of the container.

The mouse trap, according to the present invention, includes a container 10 having a closed end 11 and an open end 11'. This container is made of glass or transparent plastic and is of sufficient size to permit the entry of a mouse thereinto. This container has a flat bottom 12 on which there is mounted a transverse pivot support 13. This pivot support 13 is located approximately at the midpoint of the container between the closed end 11 and the open end 11'. Within the open end 11' of the container 10, there is disposed a closure member 14 which will have sufficient weight to retain the container in its forwardly tilted position about its pivot support 13. This end closure 14 has an opening 15 which is adapted to be closed by a trap door 16 hinged to the closure by a horizontally extending hinge pin 17. This closure member 14 is slightly bent intermediate its height so that the portion through which the opening 15 extends will be bent rearwardly of the upper portion so as to permit the full closing of the trap door when down, or after the mouse has been caught and the trap is tilted rearwardly.

The closure member 14 has rearwardly extending flanges 18 adapted to reinforce the frontal portions of the closure member and also to serve as a means for connecting the closure member 14 in the open end 11' of the container 10 for pivotal movement relative thereto. For this purpose, there is extended through holes 19 in the flanges a pin 21 which has its ends supported in the side walls of the container 10. When the top portion is pulled outwardly the lower portion having the trap door opening will be extended into the container as shown in dotted lines in Fig. 8. This will permit the removal of the mouse from the container.

When the trap is in the position shown in Figs. 1 and 4, it is set for operation. The trap door 16 will have been elevated so as to lie against the rear face of the upper portion of the closure member 14. The container will be tilted forwardly and the opening 15 will be free to permit the entrance of the mouse onto the floor of the container. The trap door 16 will be retained in its raised position inasmuch as its center of gravity will be forward of the hinge pin 17 and the upper portion of the closure member 14 will lie in a plane substantially parallel to the trap door 16. When the mouse has entered the container to gain access to the bait 21, his weight will cause the container to tilt rearwardly so as to throw the center of gravity of the trap door 16 rearward of the hinge pin 17 so that by gravity it will fall over the opening 15. The trap will then assume the position shown at Fig. 5. Thereafter the trap door 16 can be fixed against opening by moving a latch 22 mounted on the trap door into engagement with the bottom edge of the opening 15.

Thereafter, water can be passed through holes 26 in the trap door of the container for the purpose of drowning the mouse. When this operation has been effected the end closure can be tilted so that its bottom portion will enter the opening of the container to assume the position shown in Fig. 8. When the container is inverted as shown in Fig. 8, the mouse and the water can be discharged with ease from the container and the container thereby conditioned for another mouse. The upper portion of the end closure 14 is prevented from entering the container by a longitudinally extending projection 24 on its top edge. This projection 24 will extend over the top of the container and may serve as a handle by means of which the closure member 14 can be pivoted on the pin 21. This projection 24 is formed with a notch 25 received in a complementary depression in the top of the container for holding the closure member 14 in its position closing the opening 11' of the container 10.

To set the trap, the container 10 is tilted forwardly and a finger is projected through the opening 15 to pivot the trap door 16 upwardly so that it will lie forwardly against the inner face of the closure member 14.

It can therefore be easily seen that the mouse will surely be caught as there are no springs or working parts to depend on.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A sanitary mouse trap comprising a container having a closed and an open end, a closure member and means for pivotally connecting the closure member within the open end of the container, a pivot support connected to the bottom of the container in a position such that as the container is rested upon a flat surface the weight of the closure member will cause the container to be pivoted forwardly, said closure member having an opening, and a trap door hinged over the opening and adapted to be rested against the inner face of the closure member above said opening when the container is tilted forwardly and in a position with the center of gravity of said trap door forwardly of a vertical plane extending through the hinge of said trap door, said trap door being brought with its center of gravity rearwardly of the vertical plane as a mouse enters the container and tilts the same rearwardly whereby to close the trap door opening and prevent the escape of the mouse.

2. A sanitary mouse trap comprising a container having a closed and an open end, a vertical closure member and means for pivotally connecting the closure member within the open end of the container, a pivot support connected to the bottom of the container in a position such that as the container is rested upon a flat surface the weight of the closure member will cause the container to be pivoted forwardly, said closure member having an opening, a trap door hinged over the opening and adapted to be rested against the inner face of the closure member above said opening when the container is tilted forwardly and in a position with the center of gravity of said trap door forwardly of a vertical plane extending through the hinge of said trap door, said trap door being brought with its center of gravity rearwardly of the vertical plane as a mouse enters the container and tilts the same rearwardly whereby to close the trap door opening and prevent the escape of the mouse, said closure member extending within the container opening, said means permitting said closure member to be pivoted into a horizontal position in the container opening, and a portion engaging with the top of the container for preventing the rearward pivotal movement of that portion, the top engaging portion serving as a handle by which the closure member can be pivoted.

3. A sanitary mouse trap comprising a container, said container having a closed end and an open end and a bottom, a pivot support extending transversely across the bottom and adapted to support the container in two tilted positions, a closure member in the open end of the container, said closure member having a trap door opening, said closure member being shaped to have a portion above the portion having the trap door opening and which will extend forwardly when the container has been tilted upon its support under the weight of the closure member, and a trap door extending over the trap door opening and pivoted about a horizontal axis and adaped to rest when in its raised position against the forwardly extending portion of the closure member and with the center of gravity of the trap door forwardly of a vertical plane through the pivot axis of the trap door, said trap door being retained in its raised position under its weight resting upon the forwardly extending portion of the closure member and adapted to be lowered due to its weight upon the forwardly extending portion being pivoted rearwardly as the container is pivoted rearwardly upon its pivot support under the weight of the mouse.

4. A sanitary mouse trap comprising a container, said container having a closed end and an open end and a bottom, a pivot support extending transversely across the bottom and adapted to support the container in two tilted positions, a closure member in the open end of the container, said closure member having a trap door opening, said closure member being shaped to have a portion above the portion having the trap door opening and which will extend forwardly when the container has been tilted upon its support under the weight of the closure member, and a trap door extending over the trap door opening and pivoted about a horizontal axis and adapted to rest when in its raised position against the forwardly extending portion of the closure member and with the center of gravity of the trap door forwardly of a vertical plane through the pivot axis of the trap door, said trap door being retained in its raised position under its weight resting upon the forwardly extending portion of the closure member and adapted to be lowered due to its weight upon the forwardly extending portion being pivoted rearwardly as the container is pivoted rearwardly upon its pivot support under the weight of the mouse, said closure member having axle projections extending into the sides of the container to provide a pivot support whereby the closure member can be pivoted into the end opening of the container to permit the removal of the mouse therefrom.

5. A sanitary mouse trap comprising a container, said container having a closed end and an open end and a bottom, a pivot support extending transversely across the bottom and adapted to support the container in two tilted positions, a closure member in the open end of the container, said closure member having a trap door opening, said closure member being shaped to have a portion above the portion having the trap door opening and which will extend forwardly when the container has been tilted upon its support under the weight of the closure member, and a trap door extending over the trap door opening and pivoted about a horizontal axis and adapted to rest when in its raised position against the forwardly extending portion of the closure member and with the center of gravity of the trap door forwardly of a vertical plane through the pivot axis of the trap door, said trap door being retained in its raised position under its weight resting upon the forwardly extending portion of the closure member and adapted to be lowered due to its weight upon the forwardly extending portion being pivoted rearwardly as the container is pivoted rearwardly upon its pivot support under the weight of the mouse, said closure member having axle projections extending into the sides of the container to provide a pivot support whereby the closure member can be pivoted into the end opening of the container to permit the removal of the mouse therefrom, said closure member having a projection to limit the pivotal movement of the closure member into the container in one direction.

PAUL ROSEN.

REFERENCES CITED

The following references are of record in the file of this patent:

UNITED STATES PATENTS

| Number | Name | Date |
| --- | --- | --- |
| 623,875 | Brandon | Apr. 25, 1899 |
| 1,273,185 | Reich | July 23, 1918 |
| 1,581,297 | Schmuck | Apr. 20, 1926 |
| 2,314,247 | Runyan | Sept. 29, 1941 |